(12) United States Patent
Sambhwani et al.

(10) Patent No.: US 9,246,541 B2
(45) Date of Patent: Jan. 26, 2016

(54) UTRAN ENHANCEMENTS FOR THE SUPPORT OF INTER-CELL INTERFERENCE CANCELLATION

(75) Inventors: Sharad Deepak Sambhwani, San Diego, CA (US); Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 12/361,124

(22) Filed: Jan. 28, 2009

(65) Prior Publication Data
US 2009/0196162 A1    Aug. 6, 2009

Related U.S. Application Data

(60) Provisional application No. 61/025,701, filed on Feb. 1, 2008.

(51) Int. Cl.
*H04B 1/7103* (2011.01)

(52) U.S. Cl.
CPC .... *H04B 1/7103* (2013.01); *H04B 2201/70702* (2013.01)

(58) Field of Classification Search
CPC ............. H04B 1/7103; H04B 2201/70702; H04W 36/20
USPC ......................................... 370/201
See application file for complete search history.

(56) References Cited

U.S. PATENT DOCUMENTS

| 5,539,748 | A | 7/1996 | Raith |
|---|---|---|---|
| 6,493,331 | B1 | 12/2002 | Walton et al. |
| 6,906,667 | B1 | 6/2005 | Poilasne et al. |
| 7,362,726 | B2 * | 4/2008 | Petrovic et al. ............... 370/329 |
| 7,489,903 | B2 * | 2/2009 | Johansson et al. ......... 455/67.11 |
| 7,742,444 | B2 | 6/2010 | Mese et al. |
| 8,155,023 | B2 | 4/2012 | Vedantham et al. |
| 8,165,151 | B2 | 4/2012 | Suo et al. |
| 8,432,786 | B2 | 4/2013 | Li et al. |

(Continued)

FOREIGN PATENT DOCUMENTS

| CN | 1540899 A | 10/2004 |
|---|---|---|
| CN | 1543749 A | 11/2004 |

(Continued)

OTHER PUBLICATIONS

3GPP: "3rd Generation Partnership Project; Technical Specification Group Radio Access Network; UTRAN Iub interface Node B Application Part (NBAP) signalling (Release 7); 3GPP TS 25.433 V7.7.0" [online], Jan. 1, 2007, pp. 1,259-275,XP002525895.

(Continued)

*Primary Examiner* — Jason Mattis
*Assistant Examiner* — Stephen J Clawson

(57) ABSTRACT

Systems and methodologies are described that facilitate providing uplink inter-cell interference cancellation. A radio network controller can receive measurement reports in order to identify non-serving nodes that are receiving interference from user equipment. Based on evaluation of such measurement reports, an interference message can be communicated to a Node B, wherein such measurement report can include information that allows the Node B to cancel or terminate the interference caused by such identified user equipment.

76 Claims, 10 Drawing Sheets

(56) References Cited

U.S. PATENT DOCUMENTS

| | | |
|---|---|---|
| 2003/0003906 A1 | 1/2003 | Demers et al. |
| 2003/0117980 A1 | 6/2003 | Kim et al. |
| 2003/0185193 A1 | 10/2003 | Choi et al. |
| 2003/0194969 A1 | 10/2003 | Pan |
| 2003/0223396 A1 | 12/2003 | Tsai et al. |
| 2005/0041618 A1 | 2/2005 | Wei et al. |
| 2005/0053035 A1 | 3/2005 | Kwak et al. |
| 2005/0111405 A1 | 5/2005 | Kanterakis |
| 2005/0207374 A1 | 9/2005 | Petrovic et al. |
| 2005/0231433 A1 | 10/2005 | Nantz et al. |
| 2007/0004423 A1 | 1/2007 | Gerlach et al. |
| 2007/0176833 A1 | 8/2007 | Haho et al. |
| 2007/0280175 A1 | 12/2007 | Cheng et al. |
| 2007/0293260 A1* | 12/2007 | Xiao et al. .................... 455/522 |
| 2008/0019320 A1 | 1/2008 | Phan et al. |
| 2008/0049683 A1 | 2/2008 | Nakamata et al. |
| 2008/0232323 A1 | 9/2008 | Jeong et al. |
| 2008/0259873 A1 | 10/2008 | Ahmavaara et al. |
| 2008/0272889 A1 | 11/2008 | Symons |
| 2009/0017760 A1 | 1/2009 | Li et al. |
| 2009/0040972 A1 | 2/2009 | Robson et al. |
| 2009/0067387 A1* | 3/2009 | Pan ................................ 370/335 |
| 2009/0109919 A1 | 4/2009 | Bertrand et al. |
| 2009/0135761 A1 | 5/2009 | Khandekar et al. |
| 2009/0196271 A1 | 8/2009 | Song |
| 2009/0201863 A1 | 8/2009 | Pi |
| 2009/0207793 A1 | 8/2009 | Shen et al. |
| 2009/0285166 A1 | 11/2009 | Huber et al. |
| 2010/0035645 A1 | 2/2010 | Chang et al. |
| 2010/0062774 A1 | 3/2010 | Motegi et al. |
| 2010/0177741 A1 | 7/2010 | Zhang et al. |
| 2010/0227611 A1 | 9/2010 | Schmidt et al. |
| 2010/0238888 A1 | 9/2010 | Sampath et al. |
| 2010/0238901 A1 | 9/2010 | Sampath et al. |
| 2010/0240382 A1 | 9/2010 | Sampath et al. |
| 2010/0315963 A1 | 12/2010 | Jading et al. |
| 2011/0261774 A1 | 10/2011 | Lunttila et al. |
| 2012/0093093 A1 | 4/2012 | Frenger et al. |

FOREIGN PATENT DOCUMENTS

| | | |
|---|---|---|
| CN | 1706141 A | 12/2005 |
| CN | 1852558 A | 10/2006 |
| CN | 1870452 A | 11/2006 |
| CN | 1906862 A | 1/2007 |
| CN | 1989775 A | 6/2007 |
| CN | 101128056 A | 2/2008 |
| CN | 101390422 A | 3/2009 |
| EP | 1475980 A1 | 11/2004 |
| EP | 1734773 A1 | 12/2006 |
| EP | 1926217 A2 | 5/2008 |
| EP | 2292046 | 3/2011 |
| JP | 2007074755 A | 3/2007 |
| JP | 2008529375 A | 7/2008 |
| KR | 20040030150 | 4/2004 |
| KR | 20070087099 A | 8/2007 |
| RU | 2115241 C1 | 7/1998 |
| RU | 2264036 | 11/2005 |
| WO | WO9406218 A1 | 3/1994 |
| WO | WO03017696 A1 | 2/2003 |
| WO | WO2005062798 A2 | 7/2005 |
| WO | 2006016777 A2 | 2/2006 |
| WO | 2006063642 A1 | 6/2006 |
| WO | 2006079689 A1 | 8/2006 |
| WO | WO2006098665 | 9/2006 |
| WO | WO2007044281 | 4/2007 |
| WO | WO-2007049998 A1 | 5/2007 |
| WO | 2007108959 A1 | 9/2007 |
| WO | WO-2007147704 A1 | 12/2007 |
| WO | WO-2008042889 A1 | 4/2008 |
| WO | WO-2008053688 A1 | 5/2008 |
| WO | WO2008058551 A1 | 5/2008 |
| WO | WO-2008083804 A2 | 7/2008 |
| WO | 2008117202 A2 | 10/2008 |
| WO | 2009023587 A2 | 2/2009 |
| WO | WO-2009023604 A2 | 2/2009 |
| WO | WO-2009026162 A1 | 2/2009 |
| WO | WO2009126658 | 10/2009 |
| WO | WO2009129413 A2 | 10/2009 |

OTHER PUBLICATIONS

3GPP: "3rd Generation Partnership Project; Technical Specification Group Radio Access Network; UTRAN Iur interface RNSAP signalling (Release 7); 3GPP TS 25.423 V7.7.0" [online] Jan. 1, 2007, pp. 1,185-191, 203-206, XP002525894.

International Search Report and Written Opinion—PCT/US2009/032541, International Search Authority—European Patent Office—Aug. 31, 2009.

Qualcomm Europe: "UTRAN enhancements for the support of intercell interference cancellation" 3GPP Draft; R3-080069 UTRAN Enhancements for the Support of Inter-Cell Interferencecancellation, 3rd Generation Partnership Project (3GPP), Mobile Competence Centre ; 650, Route Des Lucioles ; F-06921 Sophia-Antipolis Cedex ; France,no. Sorento, Italy; 20080204, Feb. 4, 2008, XP050163302.

3GPP,"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.7.0, Dec. 1, 2008, pp. 1-144.

3GPP,"3rd Generation Partnership Project; Technical Specification Group Radio Access Network; Evolved Universal Terrestrial Radio Access Network (E-UTRAN); X2 Application Protocol (X2AP) (Release 8); Excerpt pp. 1-14, 23-25, 38-42", 3GPP Standard; 3GPP TS 36.423, 3rd Generation Partnership Project (3GPP), Mobile Competence Centre ; 650, Route Des Lucioles ; F-06921 Sophia-Antipolis Cedex ; France, No. V8.5.0, Mar. 1, 2009, pp. 1-100.

Taiwan Search Report—TW098103319—TIPO—Jun. 21, 2013.

Weber T et al., "Decentralized Interference Cancellation in Mobile Radio Networks,". WCNC2007, 2007, pp. 2190-2194.

3GPP, "Universal Mobile Telecommunications System", User Equipment, Radio Transmission and reception, TS 25.101, Version 7.10.0, Release 7.

Roessler, "Cell search and cell selection in UMTS LTE", Application Note, Sep. 2009.

Zyren Jim. "Overview of the 3GPP Long Term Evolution Physical Layer" white Paper. 27 pages.

3GPP TS 136 300—V8.7.0—LTE; Evolved Universal Terrestrial Radio Access (E-UTRA) and Evolved Universal Terrestrial Radio Access Network (E-UTRAN); Overall description; Stage 2, 3GPP TS 36.300 version 8.7.0 Release 8, Jan. 28, 2009, pp. 1-47.

* cited by examiner

UTRAN ENHANCEMENTS FOR THE SUPPORT OF INTER-CELL INTERFERENCE CANCELLATION

CROSS-REFERENCE TO RELATED APPLICATIONS

This application claims the benefit of U.S. Provisional Patent application Ser. No. 61/025,701 entitled "UTRAN ENHANCEMENTS FOR THE SUPPORT OF INTER-CELL INTERFERENCE CANCELLATION" which was filed Feb. 1, 2008. The entirety of the aforementioned application is herein incorporated by reference.

BACKGROUND

I. Field

The following description relates generally to wireless communications, and more particularly to support inter-cell interference cancellation in wireless communication networks.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

A node B cell capable of uplink interference cancellation cancels intra-cell users (e.g., user for which it belongs to the user's serving radio link set or users for which it is the non-serving cell). The node B can make use of UL-DPCH and E-DPCH information that is communicated by the S-RNC during Radio Link Setup/Addition procedure. After canceling a percentage of the intra-cell interference, the inter-cell interference then becomes the major bottleneck since it represents a significant amount of the effective or residual noise rise. Typically, it is hoped that inter-cell user equipments do not cause much impact for a long time. Hence, instantaneous RoT spikes are traditionally tolerated.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates eliminating excessive uplink interference from a non-serving node B via inter-cell interference cancellation. The method can include receiving a message from a Radio Network Controller (RNC), wherein the message is at least one of a Radio Network Subsystem Application Part (RNSAP) message or a Node B Application Part (NBAP) message that includes information related to a Radio Link procedure. The method can further include evaluating the message to identify a user equipment (UE) that is interfering with a non-serving node B based upon the information. Moreover, the method can comprise cancelling the uplink interference from the UE utilizing the evaluation.

Another aspect relates to a wireless communications apparatus. The wireless communications apparatus can include at least one processor configured to receive a message from a Radio Network Controller (RNC), wherein the message is at least one of a Radio Network Subsystem Application Part (RNSAP) message or a Node B Application Part (NBAP) message that includes information related to a Radio Link procedure, evaluate the message to identify a user equipment (UE) that is interfering with a non-serving node B based upon the information, and cancel the uplink interference from the UE utilizing the evaluation. Further, the wireless communications apparatus can include memory coupled to the at least one processor.

Yet another aspect relates to a wireless communications apparatus that enables eliminating excessive uplink interference from a non-serving node B via inter-cell interference cancellation. The wireless communications apparatus can include means receiving a message from a Radio Network Controller (RNC), wherein the message is at least one of a Radio Network Subsystem Application Part (RNSAP) message or a Node B Application Part (NBAP) message that includes information related to a Radio Link procedure. Additionally, the wireless communications apparatus can comprise means for evaluating the message to identify a user equipment (UE) that is interfering with a non-serving node B based upon the information. Furthermore, the wireless communications apparatus can include means for cancelling the uplink interference from the UE utilizing the evaluation.

Still another aspect relates to a computer program product comprising a computer-readable medium having stored thereon code for causing at least one computer to receive a message from a Radio Network Controller (RNC), wherein the message is at least one of a Radio Network Subsystem Application Part (RNSAP) message or a Node B Application Part (NBAP) message that includes information related to a Radio Link procedure, code for causing at least one computer to evaluate the message to identify a user equipment (UE) that is interfering with a non-serving node B based upon the information, and code for causing at least one computer to cancel the uplink interference from the UE utilizing the evaluation.

According to other aspects, a method that facilitates implementing inter-cell interference cancellation. The method can comprise receiving a portion of a measurement report related to a user equipment, wherein the measurement report relates to a time from detection to active set update. Moreover, the method can include evaluating the portion of the measurement report to identify an interfering node B that is a non-serving node B for the user equipment based upon exceeding a first threshold that is lower than a second threshold used for active set management for a serving node B. Furthermore, the method can include transmitting an interference message to the interfering node B based upon the evaluation of the measurement report being between the first threshold and the second threshold, wherein the interference message specifies the interfering node B receiving interference from the user equipment.

Another aspect relates to a wireless communications apparatus. The wireless communications apparatus can include at least one processor configured to receive a portion of a measurement report related to a user equipment, wherein the measurement report relates to a time from detection to active set update, evaluate the portion of the measurement report to identify an interfering node B that is a non-serving node B for the user equipment based upon exceeding a first threshold that is lower than a second threshold used for active set management for a serving node B, and transmit an interference message to the interfering node B based upon the evaluation of the measurement report being between the first threshold and the second threshold, wherein the interference message specifies the interfering node B receiving interference from the user equipment. Further, the wireless communications apparatus can include memory coupled to the at least one processor.

Another aspect relates to a wireless communications apparatus that enables implementing inter-cell interference cancellation. The wireless communications apparatus can comprise means for receiving a portion of a measurement report related to a user equipment, wherein the measurement report relates to a time from detection to active set update. Moreover, the method can include means for evaluating the portion of the measurement report to identify an interfering node B that is a non-serving node B for the user equipment based upon exceeding a first threshold that is lower than a second threshold used for active set management for a serving node B. Furthermore, the method can include means for transmitting an interference message to the interfering node B based upon the evaluation of the measurement report being between the first threshold and the second threshold, wherein the interference message specifies the interfering node B receiving interference from the user equipment.

Still another aspect relates to a computer program product comprising a computer-readable medium having stored thereon code for causing at least one computer to code for causing at least one computer to receive a portion of a measurement report related to a user equipment, wherein the measurement report relates to a time from detection to active set update, code for causing at least one computer to evaluate the portion of the measurement report to identify an interfering node B that is a non-serving node B for the user equipment based upon exceeding a first threshold that is lower than a second threshold used for active set management for a serving node B, and code for causing at least one computer to transmit an interference message to the interfering node B based upon the evaluation of the measurement report being between the first threshold and the second threshold, wherein the interference message specifies the interfering node B receiving interference from the user equipment.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
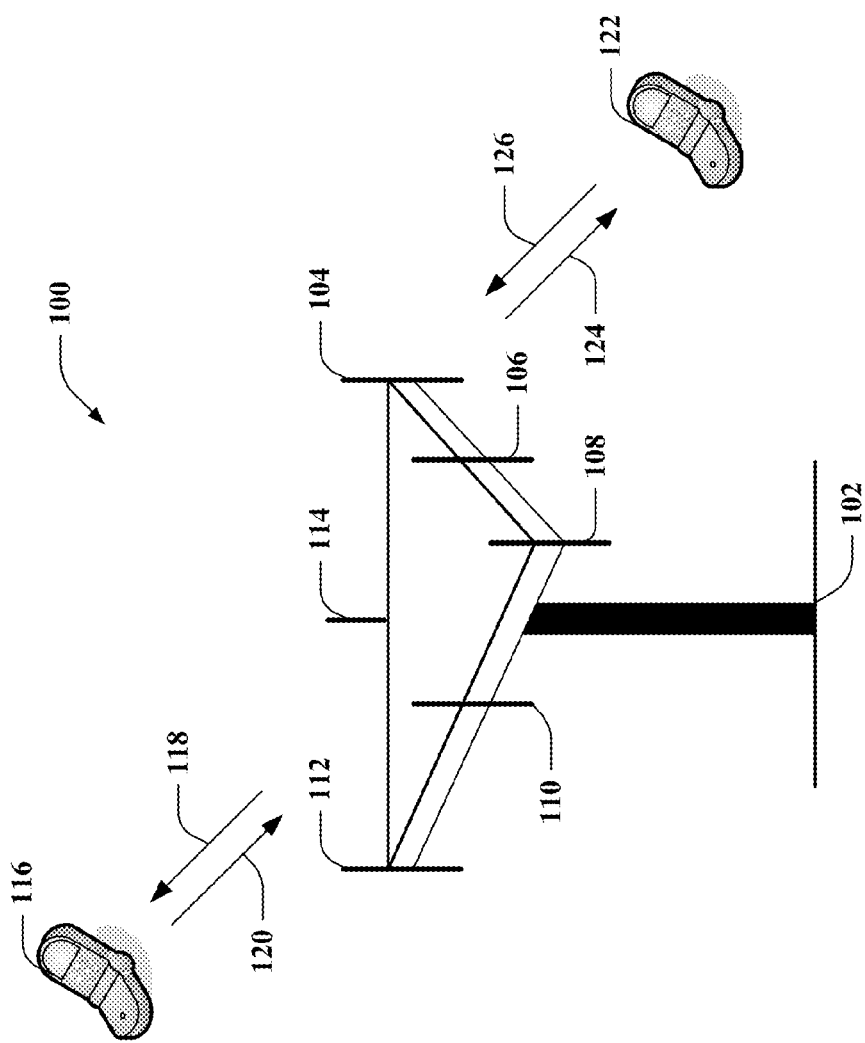
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "component," "evaluator," "cancellation," "detector," "collector," "transmitter," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

In general, the subject innovation can employ uplink inter-cell interference cancellation. Inter-cell interference can be the sum of the W-CDMA waveforms of the users who do not communicate with the Node B cell, wherein the Node B cell is not aware of these users and hence does not power control or rate control such users. In particular, a user equipment (UE) can be connected to a serving Node B via one or more radio links. Yet, the same UE can be causing excessive uplink interference in a neighbor Node B (e.g., non-serving Node B), thus reducing the uplink capacity of the neighboring Node B. The claimed subject matter can enable the cancellation and elimination of the interference caused by the UE and the non-serving Node B by utilizing minimal information related to the interfering UE and/or non-serving Node B. By cancelling the interference caused by the UE, the uplink capacity can therefore be increased and instantaneous Rise Over Thermal (RoT) spikes are reduced.

Figure 2:
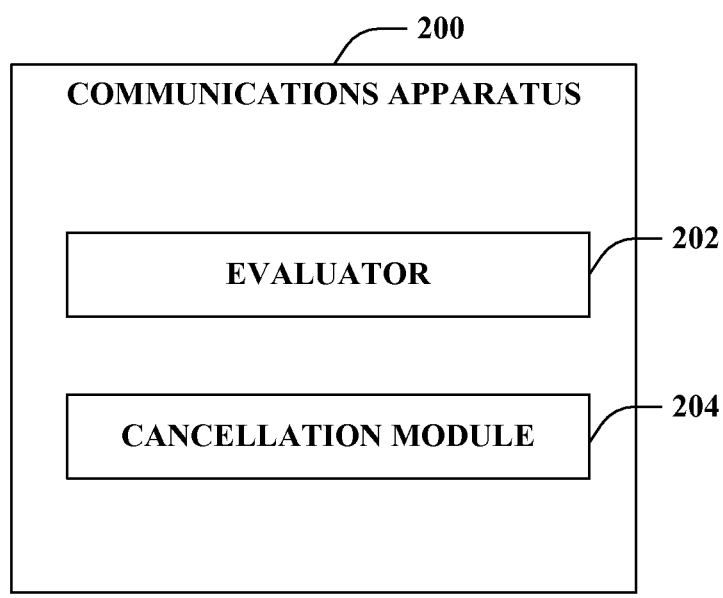
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to generate a message that can be utilized to enable inter-cell interference cancellation in which a non-serving Node B can eliminate interfering user equipment (UE).

The communications apparatus 200 can include an evaluator 202 that can determine which user equipment (UE) is causing interference with a non-serving Node B. The evaluator 202 can determine if a UE is causing interference with a neighboring cell (e.g., a non-serving Node B) based upon an evaluation of a measurement report. For example, an additional event can be utilized to detect cells or nodes with which the UE is interfering (e.g., the additional event can have a larger reporting range than one used for active set management). In other words, the evaluator 202 can evaluate the measurement reports to identify a UE with characteristics that are above a first threshold, wherein the first threshold is lower than a second threshold employed to identify active set management.

The communications apparatus can further include a cancellation module 204 that can terminate, cancel, or eliminate the interference being caused by the identified UE and a non-serving Node B. The cancellation module 204 can leverage the measurement reports and the identified interference causing ULE's in order to terminate the uplink inter-cell interference. For example, the identified UE's that are causing interference can be identified based upon the measurement reports and the determination provided by the evaluator 202. Once identified, the cancellation module 204 can cancel the interference caused by such UE's for the non-serving Node B. It is to be appreciated that the cancellation module 204 can communicate information to the non-serving Node B that is receiving interference from a UE, wherein such information is sufficient to cancel such interference.

Moreover, although not shown, it is to be appreciated that communications apparatus 200 can include memory that retains instructions with respect to receiving a message from a Radio Network Controller (RNC), wherein the message is at least one of a Radio Network Subsystem Application Part (RNSAP) message or a Node B Application Part (NBAP) message that includes information related to a Radio Link procedure, evaluating the message to identify a user equipment (UE) that is interfering with a non-serving Node B based upon the information, cancelling the uplink interference from the UE utilizing the evaluation, and the like.

Furthermore, it is to be appreciated that communications apparatus 200 can include memory that retains instructions with respect to receiving a portion of a measurement report related to a user equipment, wherein the measurement report relates to a time from detection to active set update, evaluating the portion of the measurement report to identify an interfering Node B that is a non-serving Node B for the user equipment based upon exceeding a first threshold that is lower than a second threshold used for active set management for a serving Node B, transmitting an interference message to the interfering Node B based upon the evaluation of the measurement report being between the first threshold and the second threshold, wherein the interference message specifies the interfering Node B receiving interference from the user equipment, and the like. Further, communications apparatus 200 can include a processor that may be utilized in connection with executing instructions (e.g., instructions retained within memory, instructions obtained from a disparate source, . . . ).

Figure 3:
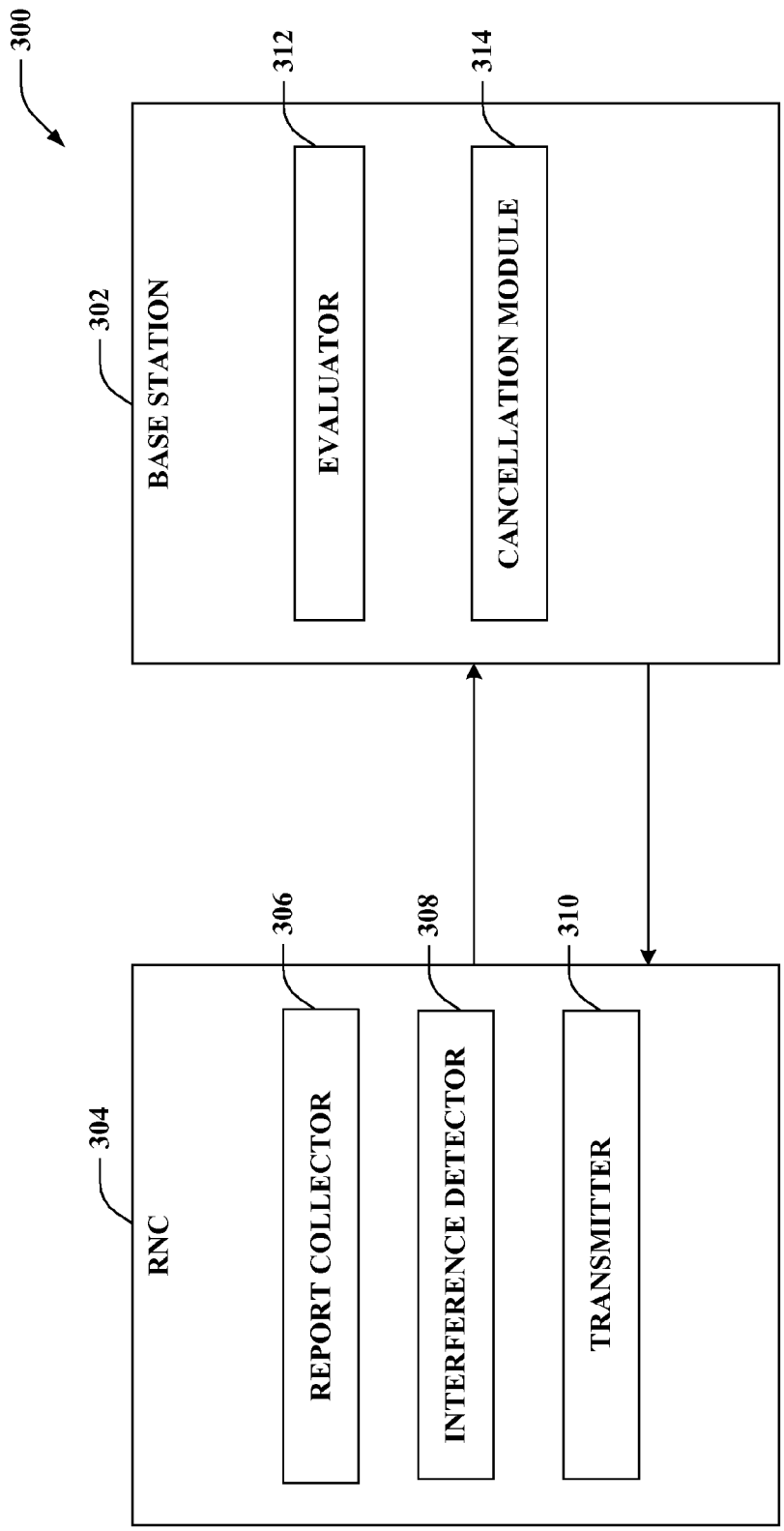
FIG. 3 is an illustration of an example wireless communications system that facilitates eliminating user equipment that is providing excessive uplink interference to a neighbor node B in comparison to a serving node B.

Now referring to FIG. 3, illustrated is a wireless communications system 300 that facilitates eliminating user equipment that is providing excessive uplink interference to a neighbor Node B in comparison to a serving Node B. The system 300 includes a base station 302 that communicates with a Radio Network Controller (RNC) 304 (and/or any number of disparate communication apparatus (not shown)). Base station 302 can transmit information to RNC 304 over a forward link channel; further base station 302 can receive information from RNC 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the RNC 304 as well and vice versa, in one example; the configuration depicted excludes these components for ease of explanation.

RNC 304 can include a report collector 306 that can receive or request measurement reports from at least one user equipment (UE). The measurement reports can include information elements (IEs) related to a radio link setup procedure or a radio link addition procedure. For example, the message reports can include information related to users that take a duration of time to include neighboring cells in their active set from the time these neighbor cells are detected the first time by the UE (e.g., duration or time from detection to active set update). In particular, the following information can be included in the measurement report in order to identify interfering UE: UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, and E-DPCCH Power Offset. It is to be appreciated that the measurement report can include the above stated information, portions of such information, and/or any other suitable information that can identify an interfering UE with a non-serving Node B.

The RNC 304 can further include an interference detector 308 that can evaluate the measurement report in order to identify and/or locate a UE that is interfering with a particular non-serving Node B. In general, the interference detector 308 can identify an interfering UE based upon being above a first threshold and below a second threshold, wherein the second threshold is used for active set management. In other words, the second threshold can be related to making a non-serving Node B active set for a UE, whereas the first threshold is a lower limit in which can identify whether the UE is interfering with the non-serving Node B (e.g., being above the first threshold identifies interference, and the second threshold identifies the Node B should be active set).

The RNC 304 can further include a transmitter 310 that can communicate a message to the base station 302 in order to enable the inter-cell interference cancellation. In particular, the transmitter 310 can signal to an ICIC-capable Node B (e.g., base station 302) appropriate information on interfering UE's that are served by neighbor Node B's (e.g., non-serving Node B's). The transmitter 310 can define a message for each interfering UE and include information elements (IEs). Such information elements can enable the base station 302 to identify and cancel interfering UE's. Moreover, the information elements can be related to a radio link setup procedure or a radio link addition procedure in NBAP/RNSAP.

Base station 302 can include an evaluator 312. The evaluator 312 can utilize the message with information elements in order to terminate or cancel the interfering UE with the base station 302 (e.g., non-serving Node B). It is to be appreciated that the message with the information elements can be received via the RNC 304, wherein such message can be a RNSAP/NBAP message for each respective interfering UE for the base station 302. In other words, a message can be communicated to each base station 302 or non-serving Node B for each interfering UE.

Additionally, the base station 302 can include a cancellation module 314 that can leverage the information elements identified by the evaluator 312 to enable the base station 302 to cancel the interference caused by such UE. The cancellation module 314 can cancel the UE that is interfering with the base station 302 (e.g., non-serving Node B, neighbor Node B that is non-serving, etc.). By eliminating the interference caused by such UE, the uplink capacity can be maximized provided that the message received by the RNC 304 includes minimal information on such interfering UE (e.g., information elements, etc.).

Furthermore, the base station 302 can maintain a list of interfering UE's for each of its own cells, wherein this list can be used by the Node B to perform inter-cell interference cancellation. It is to be appreciated that the inter-cell mechanism and the algorithm utilized in the Node B to maintain the lists of interfering UE's is a matter of implementation with no standard changes. Moreover, it is to be appreciated that the identification of interfering UE's can be determined in real time (e.g., on-the-fly) and/or pre-defined (e.g., existing listings or accumulated listings of UE's that are interfering on a non-serving Node B).

In general, the subject innovation can cancel the presence of inter-cell users in a system who potentially interfere with neighbor cells. It is observed in field logs, that a neighbor cell can be added to a UE's active set, much later (e.g., of the order of tens of seconds) after the UE first detected the neighbor cell. The delay in adding the neighbor cell to the user's active set, stems from the fact that the neighbor cell's pilot strength may be below the reporting range of the serving cell's pilot strength and hence even though it is detected by the UE, it is not considered good enough to enter the UE's active set. Nevertheless, during this duration, since the UE is not power controlled by the neighbor cell, the UE can cause inter-cell interference to the neighbor cell's uplink. Thus, the second threshold (discussed above) is a level that establishes active set, whereas a first threshold (discussed above) is a lower level (in comparison to the second threshold) that can be utilized to detect interfering UE's.

Moreover, although not shown, it is to be appreciated that base station 302 can include memory that retains instructions with respect to receiving a message from a Radio Network Controller (RNC), wherein the message is at least one of a Radio Network Subsystem Application Part (RNSAP) message or a Node B Application Part (NBAP) message that includes information related to a Radio Link procedure, evaluating the message to identify a user equipment (UE) that is interfering with a non-serving Node B based upon the information, cancelling the uplink interference from the UE utilizing the evaluation, and the like.

Furthermore, it is to be appreciated that base station 302 can include memory that retains instructions with respect to receiving a portion of a measurement report related to a user equipment, wherein the measurement report relates to a time from detection to active set update, evaluating the portion of the measurement report to identify an interfering Node B that is a non-serving Node B for the user equipment based upon exceeding a first threshold that is lower than a second threshold used for active set management for a serving Node B, transmitting an interference message to the interfering Node B based upon the evaluation of the measurement report being between the first threshold and the second threshold, wherein the interference message specifies the interfering Node B receiving interference from the user equipment, and the like.

Further, base station 302 can include a processor that may be utilized in connection with executing instructions (e.g., instructions retained within memory, instructions obtained from a disparate source, . . . ).

Figure 4:
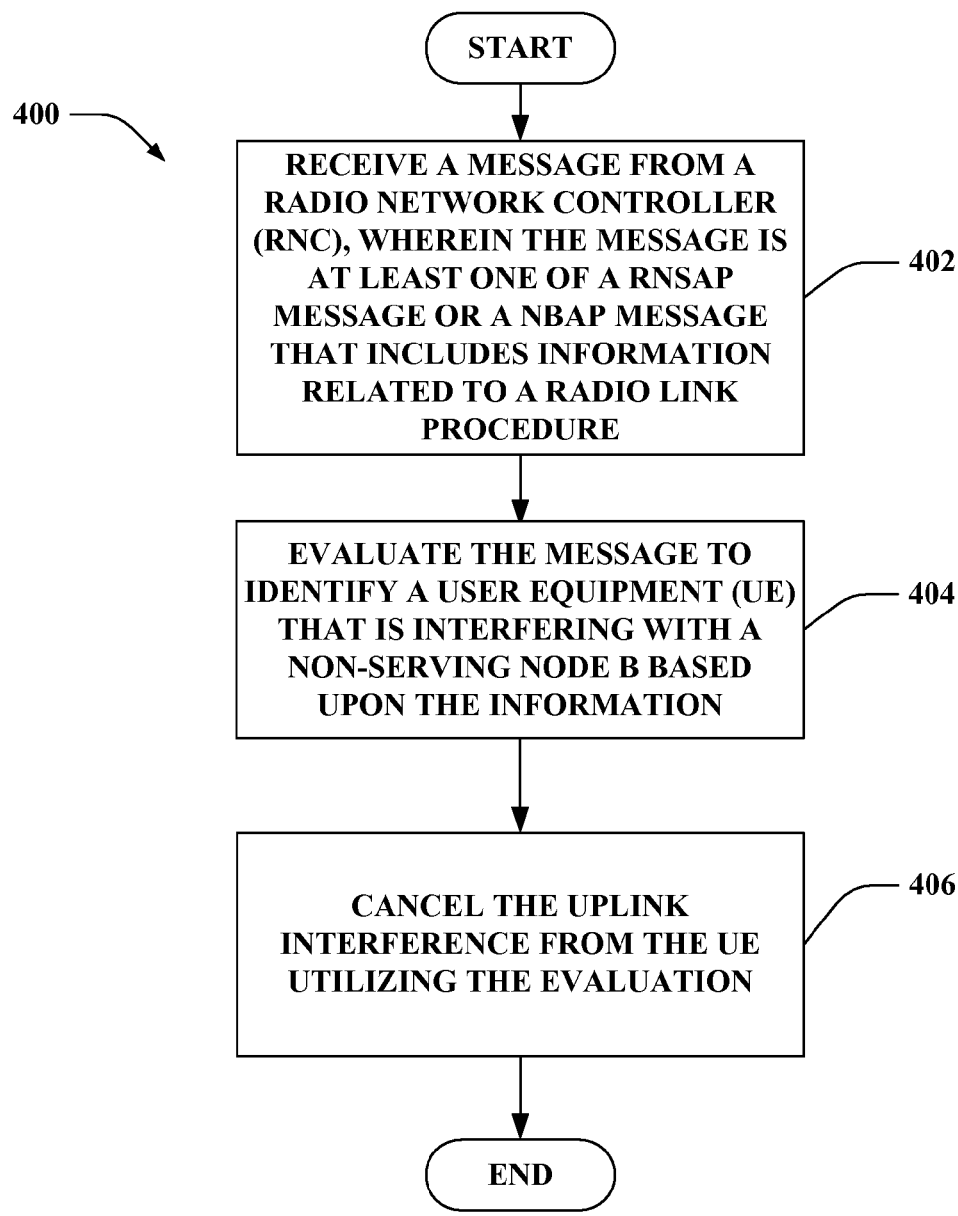
FIG. 4 is an illustration of an example methodology that cancels uplink interference related to a user equipment that is causing with a non-serving node B.
Figure 5:
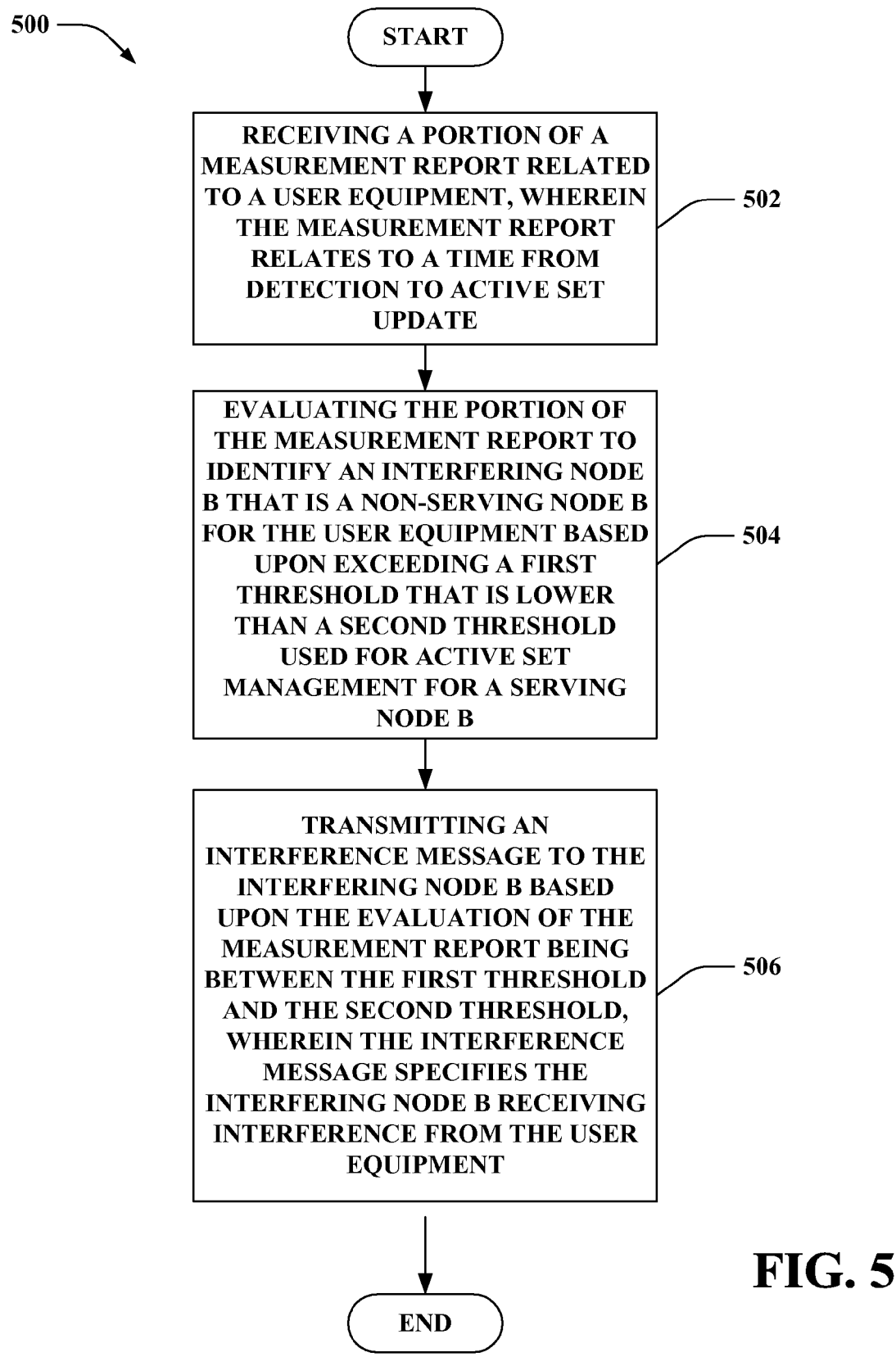
FIG. 5 is an illustration of an example methodology that generates an interference message that includes identifying information related to a user equipment causing uplink interference with a non-serving node B.

Referring to FIGS. 4-5, methodologies relating to configuring a flush timer are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates cancels uplink interference related to a user equipment that is causing with a non-serving node B. At reference numeral 402, a message can be received from a Radio Network Controller (RNC), wherein the message is at least one of a RNSAP message or a NBAP message that includes information related to a Radio Link procedure. It is to be appreciated that the information can be information elements such as, but not limited to, UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, and E-DPCCH Power Offset. At reference numeral 404, the message can be evaluated to identify a user equipment (UE) that is interfering with a non-serving node B based upon the information. At reference numeral 406, the uplink interference from the UE can be cancelled utilizing the evaluation.

Now referring to FIG. 5, a methodology 500 that facilitates generates an interference message that includes identifying information related to a user equipment causing uplink interference with a non-serving Node B. At reference numeral 502, a portion of a measurement report related to a user equipment can be received, wherein the measurement report relates to a time from detection to active set update. At reference numeral 504, the portion of the measurement report can be evaluated to identify an interfering Node B that is a non-serving Node B for the user equipment based upon exceeding a first threshold that is lower than a second threshold used for active set management for a serving Node B. At reference numeral 506, an interference message can be transmitted to the interfering Node B based upon the evaluation of the measurement report being between the first threshold and the second threshold, wherein the interference message specifies the interfering Node B receiving interference from the user equipment.

Figure 6:
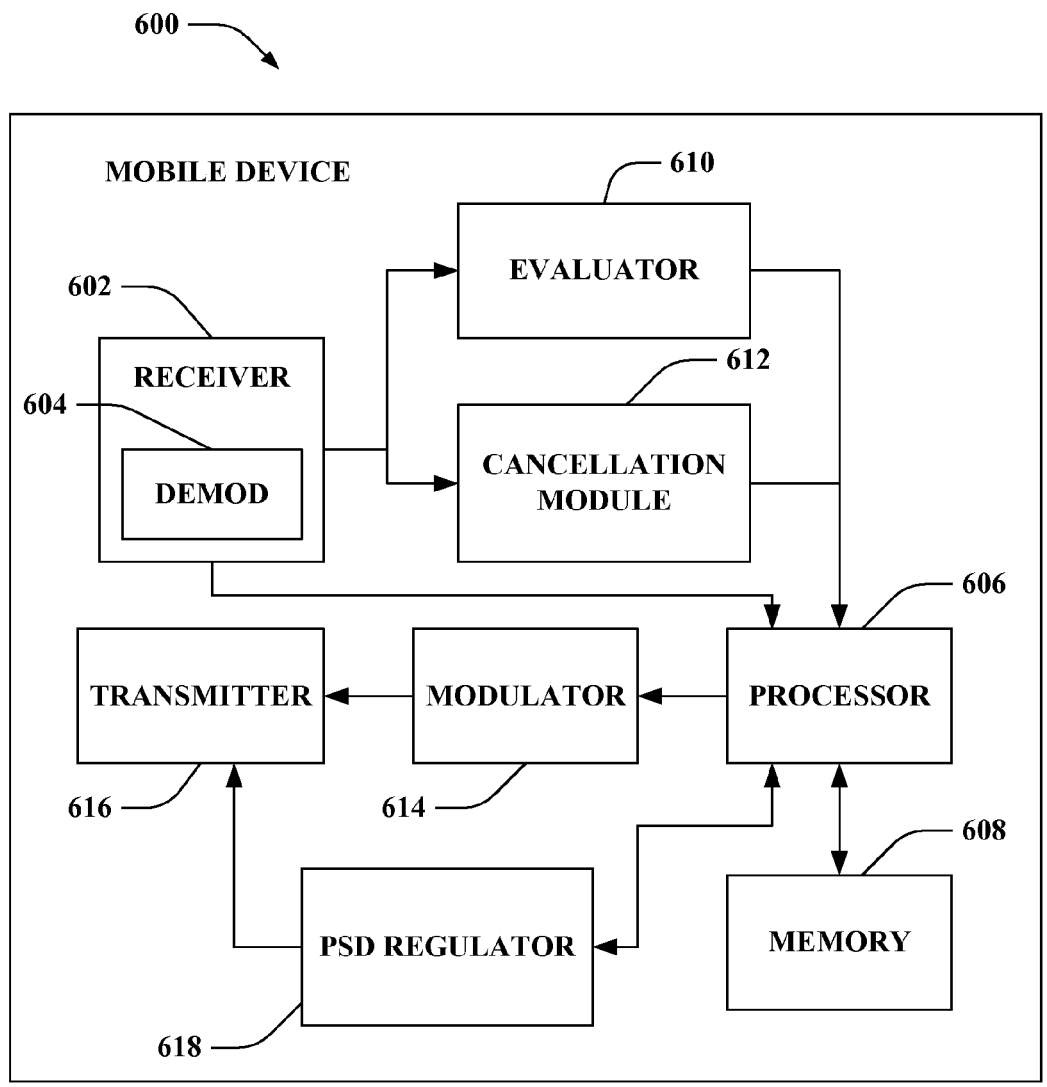
FIG. 6 is an illustration of an example mobile device that facilitates supporting uplink inter-cell interference cancellation in a wireless communication system.

FIG. 6 is an illustration of a mobile device 600 that facilitates supporting uplink inter-cell interference cancellation in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to at least one of an evaluator 610 or a cancellation module 612. The evaluator 610 can accumulate information, such as a measurement report that provides information regarding the mobile device 600 (e.g., UE) and interference with neighboring cells (e.g., non-serving node B, etc.). The evaluator 610 can gather information to communicate to a radio network controller (RNC) in order to enable identification of inter-cell interference. The cancellation module 612 can terminate or cancel interference caused between the mobile device 600 and a non-serving cell. In general, the cancellation module 612 can leverage information or analysis related to the measurement reports in order to cancel interference.

Mobile device 600 still further comprises a modulator 614 and transmitter 616 that respectively modulate and transmit signals to, for instance, a base station, another mobile device, etc. Although depicted as being separate from the processor 606, it is to be appreciated that the evaluator 610, cancellation module 612, demodulator 604, and/or modulator 614 can be part of the processor 606 or multiple processors (not shown).

Figure 7:
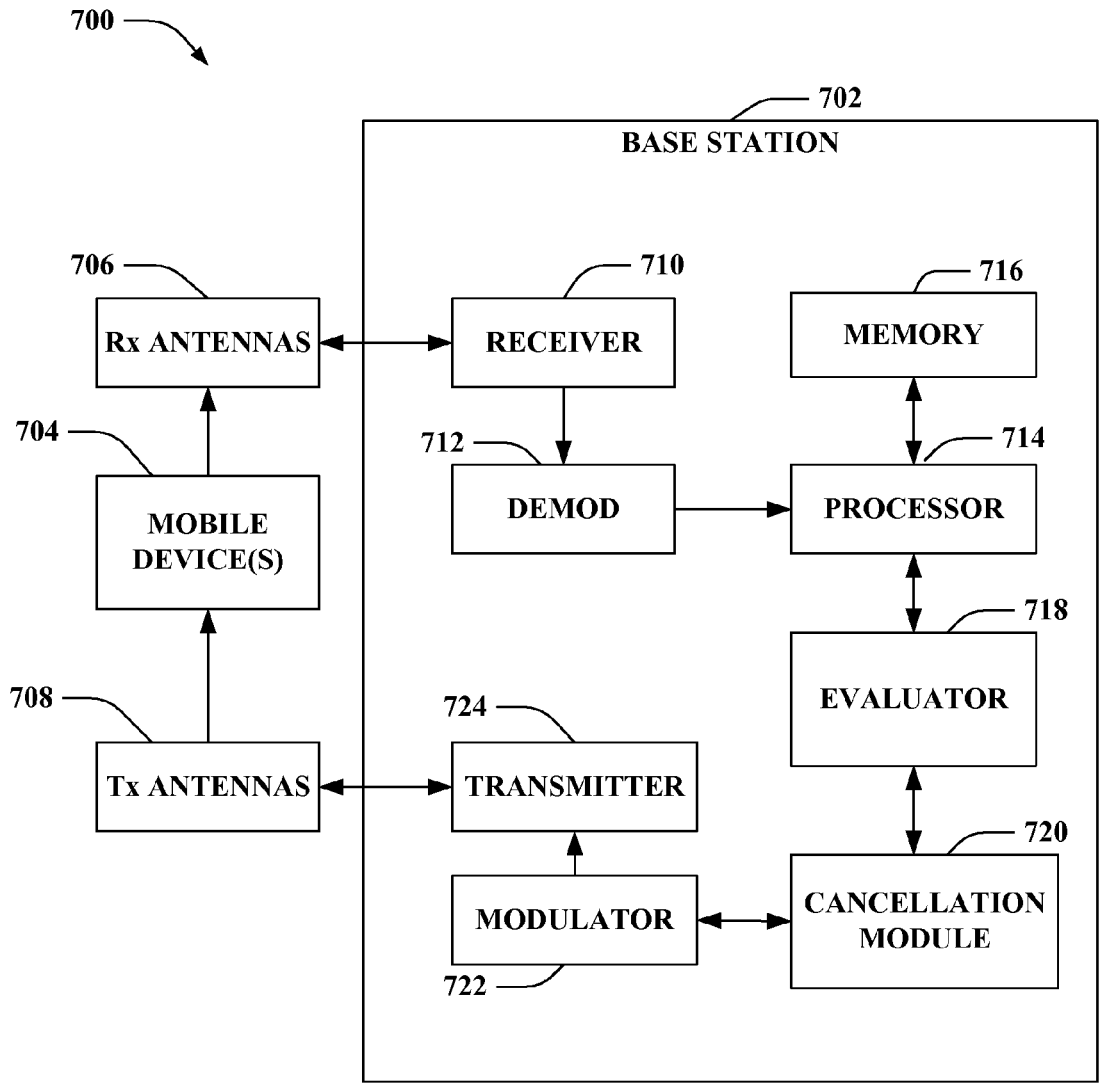
FIG. 7 is an illustration of an example system that facilitates supporting uplink inter-cell interference cancellation in a wireless communication environment.

FIG. 7 is an illustration of a system 700 that facilitates supporting uplink inter-cell interference cancellation in a wireless communication environment as described supra. The system 700 comprises a base station 702 (e.g., access point, with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Moreover, the processor 714 can be coupled to at least one of an evaluator 718 or a cancellation module 720. The evaluator 718 can receive information, such as a measurement report that provides information regarding a UE that interferes with neighboring cells (e.g., non-serving node B, etc.). The evaluator 718 can examine the measurement report in order to identify interfering UE's based upon the received information from a radio network controller (RNC). The cancellation module 720 can terminate or cancel interference caused between UE and a non-serving cell. In general, the cancellation module 612 can leverage information or analysis related to the measurement reports in order to cancel interference caused by the interfering UE.

Furthermore, although depicted as being separate from the processor 714, it is to be appreciated that the evaluator 718, cancellation module 720, demodulator 712, and/or modulator 722 can be part of the processor 714 or multiple processors (not shown).

Figure 8:
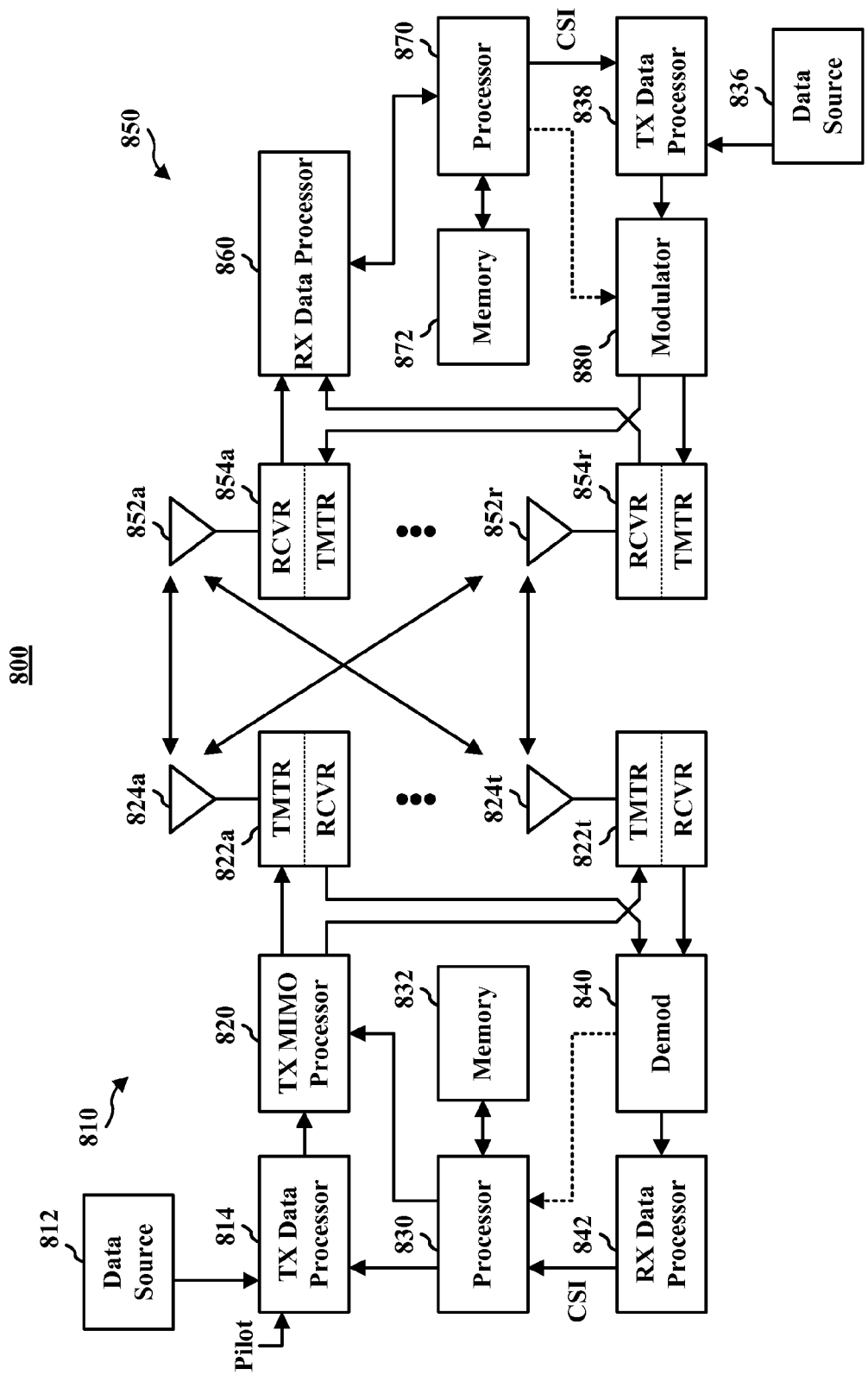
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
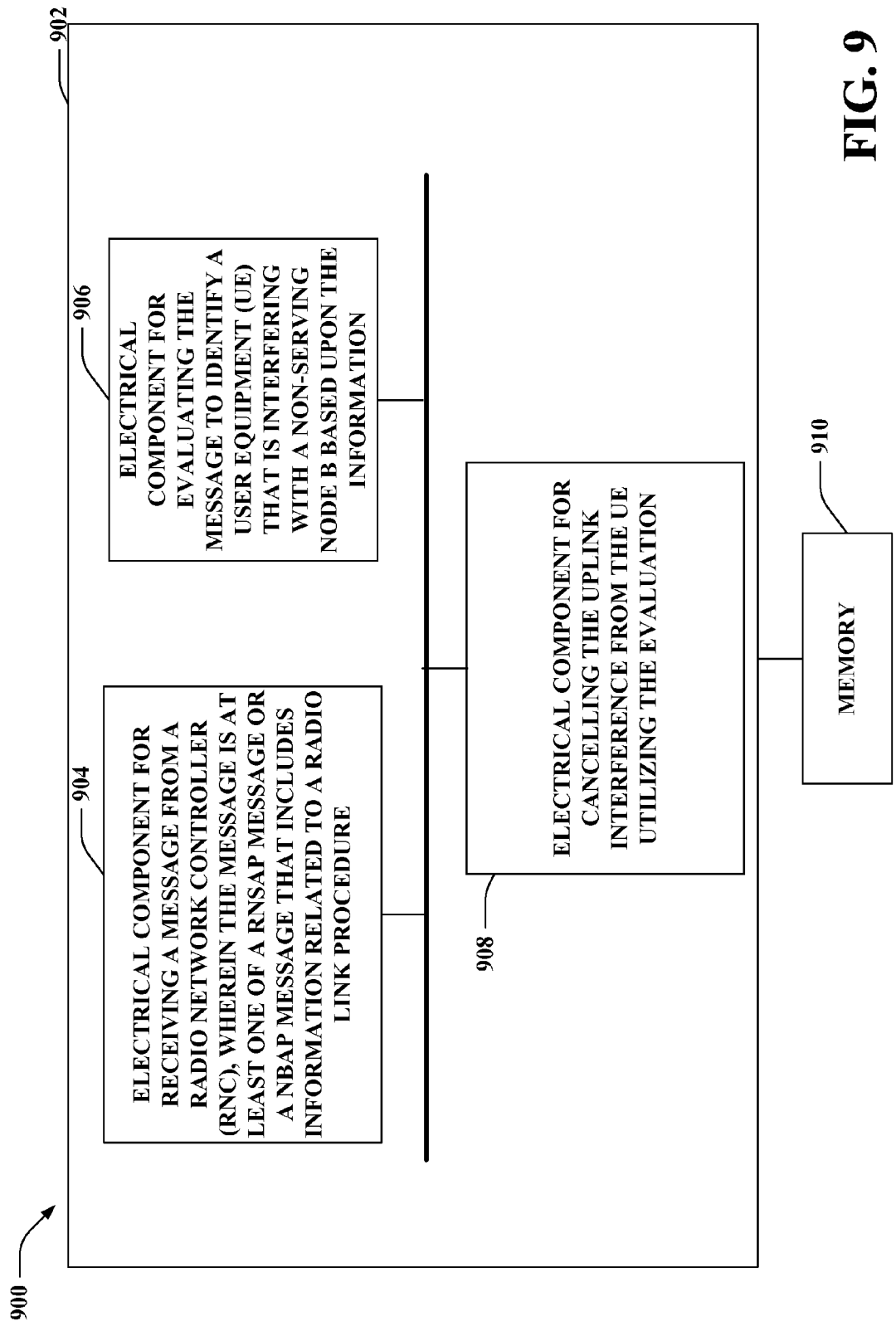
FIG. 9 is an illustration of an example system that facilitates cancelling uplink interference a user equipment is causing with a non-serving node B.

With reference to FIG. 9, illustrated is a system 900 that facilitates cancelling uplink interference a user equipment is causing with a non-serving Node B. For example, system 900 can reside at least partially within a base station, a radio network controller (RNC), mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for receiving a message from a Radio Network Controller (RNC), wherein the message is at least one of a RNSAP message or a NBAP message that includes information related to a Radio Link procedure 904. In addition, the logical grouping 902 can comprise an electrical component for evaluating the message to identify a user equipment (UE) that is interfering with a non-serving Node B based upon the information 906. Moreover, the logical grouping 902 can include an electrical component for cancelling the uplink interference from the UE utilizing the evaluation 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
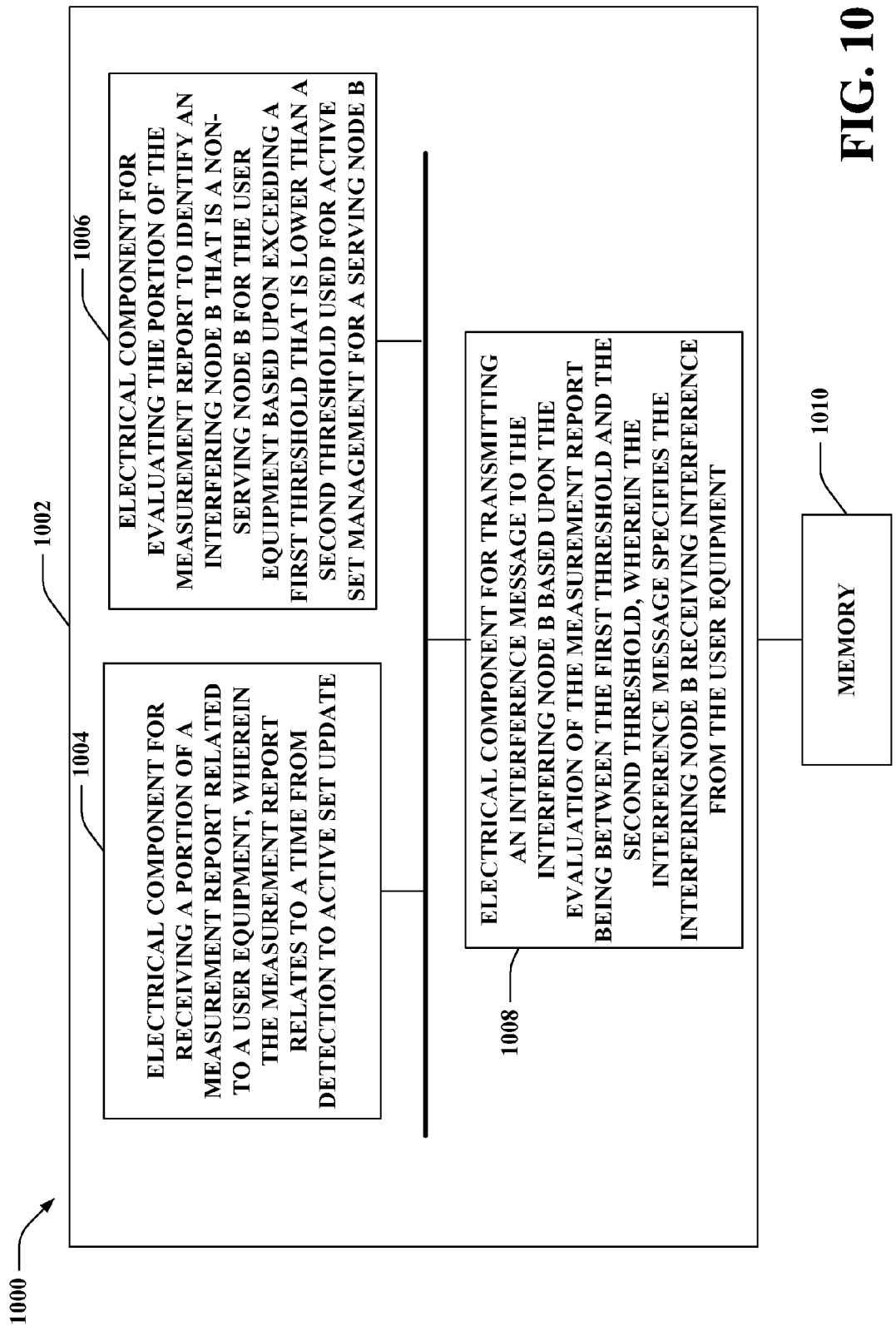
FIG. 10 is an illustration of an example system that can generate an interference message that includes identifying information related to a user equipment causing uplink interference with a non-serving node B.

Turning to FIG. 10, illustrated is a system 1000 that can generate an interference message that includes identifying information related to a user equipment causing uplink interference with a non-serving Node B. System 1000 can reside within a base station, a radio network controller (RNC), mobile device, etc., for instance. As depicted, system 1000 includes functional blocks that can represent functions implemented by a processor, software, or combination thereof (e.g., firmware). System 1000 includes a logical grouping 1002 of electrical components that facilitate cancelling inter-cell interference in order to optimize uplink capacity. The logical grouping 1002 can include an electrical component for receiving a portion of a measurement report related to a user equipment, wherein the measurement report relates to a time from detection to active set update 1004. In addition, the logical grouping 1002 can comprise an electrical component for evaluating the portion of the measurement report to identify an interfering Node B that is a non-serving Node B for the user equipment based upon exceeding a first threshold that is lower than a second threshold used for active set management for a serving Node B 1006. Furthermore, the logical grouping 1002 can include an electrical component for transmitting an interference message to the interfering Node B based upon the evaluation of the measurement report being between the first threshold and the second threshold, wherein the interference message specifies the interfering Node B receiving interference from the user equipment 1008. Additionally, system 1000 can include a memory 1010 that retains instructions for executing functions associated with electrical components 1004, 1006, and 1008. While shown as being external to memory 1010, it is to be understood that electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates eliminating excessive uplink interference via inter-cell interference cancellation, comprising:
   receiving a message from a Radio Network Controller (RNC), wherein the message is at least one of a Radio Network Subsystem Application Part (RNSAP) message or a Node B Application Part (NBAP) message that includes information related to performing a Radio Link procedure for a user equipment (UE) and a non-serving node B;
   evaluating the message to identify that the UE is interfering with the non-serving node B based upon the information; and
   cancelling the uplink interference from the UE utilizing the evaluating of the message to increase an uplink capacity of the non-serving node B.

2. The method of claim 1, wherein the Radio Link procedure is at least one of a Radio Setup procedure or a Radio Addition procedure.

3. The method of claim 1, wherein the information includes an information element (IE), wherein the information element is at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

4. The method of claim 1, further comprising employing the cancelling of the uplink interference within a UMTS Terrestrial Radio Access Network (UTRAN).

5. The method of claim 1, further comprising maintaining a list of interfering user equipment for at least one of a base station, the non-serving node B, a neighboring cell, or a cell having inter-cell interference.

6. The method of claim 1, further comprising identifying that the UE is interfering with at least one of a base station, another non-serving node B, a neighboring cell, or a cell having inter-cell interference as the inter-cell interference occurs.

7. The method of claim 1, further comprising utilizing a listing of UEs that are interfering with at least one of a base station, the non-serving node B, a neighboring cell, or a cell having inter-cell interference in the cancelling of the uplink interference from the UE.

8. The method of claim 1, further comprising creating the message based at least in part on a measurement report for the UE.

9. The system of claim 1, wherein receiving the message comprises receiving the message at a Node B, wherein the information identifies interfering UEs.

10. A wireless communications apparatus, comprising:
at least one processor configured to:
receive a message from a Radio Network Controller (RNC), wherein the message is at least one of a Radio Network Subsystem Application Part (RNSAP) message or a Node B Application Part (NBAP) message that includes information related to performing a Radio Link procedure for a user equipment (UE) and a non-serving node B;
evaluate the message to identify that the UE is interfering with the non-serving node B based upon the information;
cancel the uplink interference from the UE based on evaluating the message to increase an uplink capacity of the non-serving node B; and
a memory coupled to the at least one processor.

11. The wireless communications apparatus of claim 10, wherein the Radio Link procedure is at least one of a Radio Setup procedure or a Radio Addition procedure.

12. The wireless communications apparatus of claim 10, wherein the information includes an information element (IE), wherein the information element is at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

13. The wireless communications apparatus of claim 10, wherein the at least one processor is further configured to employ the cancelling of the uplink interference within a UMTS Terrestrial Radio Access Network (UTRAN).

14. The wireless communications apparatus of claim 10, wherein the at least one processor is further configured to maintain a list of interfering user equipment for at least one of a base station, the non-serving node B, a neighboring cell, or a cell having inter-cell interference.

15. The wireless communications apparatus of claim 10, wherein the at least one processor is further configured to identify that the UE is interfering with at least one of a base station, another non-serving node B, a neighboring cell, or a cell having inter-cell interference as the inter-cell interference occurs.

16. The wireless communications apparatus of claim 10, wherein the at least one processor is further configured to utilize a listing of UEs that are interfering with at least one of a base station, the non-serving node B, a neighboring cell, or a cell having inter-cell interference in cancelling the uplink interference from the UE.

17. The wireless communications apparatus of claim 10, wherein the at least one processor is further configured to create the message based at least in part on a measurement report for the UE.

18. The wireless communications apparatus of claim 10, wherein the at least one processor is configured to receive the message at a Node B, wherein the information identifies interfering UEs.

19. A wireless communications apparatus that enables eliminating excessive uplink interference via inter-cell interference cancellation, comprising:
means for receiving a message from a Radio Network Controller (RNC), wherein the message is at least one of a Radio Network Subsystem Application Part (RNSAP) message or a Node B Application Part (NBAP) message that includes information related to performing a Radio Link procedure for a user equipment (UE) and a non-serving node B;
means for evaluating the message to identify that the UE is interfering with the non-serving node B based upon the information; and
means for cancelling the uplink interference from the UE based on evaluating the message to increase an uplink capacity of the non-serving node B.

20. The wireless communications apparatus of claim 19, wherein the Radio Link procedure is at least one of a Radio Setup procedure or a Radio Addition procedure.

21. The wireless communications apparatus of claim 19, wherein the information includes an information element (IE), wherein the information element is at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

22. The wireless communications apparatus of claim 19, further comprising means for employing the canceling of the uplink interference within a UMTS Terrestrial Radio Access Network (UTRAN).

23. The wireless communications apparatus of claim 19, further comprising means for maintaining a list of interfering user equipment for at least one of a base station, the non-serving node B, a neighboring cell, or a cell having inter-cell interference.

24. The wireless communications apparatus of claim 19, further comprising means for identifying that the UE is interfering with at least one of a base station, another non-serving node B, a neighboring cell, or a cell having inter-cell interference as the inter-cell interference occurs.

25. The wireless communications apparatus of claim 19, further comprising means for utilizing a listing of UEs that are interfering with at least one of a base station, the non-serving node B, a neighboring cell, or a cell having inter-cell interference in cancelling the uplink interference from the UE.

26. The wireless communications apparatus of claim 19, further comprising means for creating the message based at least in part on a measurement report for the UE.

27. The wireless communications apparatus of claim 19, wherein the means for receiving the message comprises means for receiving the message at a Node B, wherein the information identifies interfering UEs.

28. A computer program product, comprising:
a non-transitory computer-readable medium comprising:
code for causing at least one computer to receive a message from a Radio Network Controller (RNC), wherein the message is at least one of a Radio Network Subsystem Application Part (RNSAP) message or a Node B Application Part (NBAP) message that includes information related to performing a Radio Link procedure for a user equipment (UE) and a non-serving node B;
code for causing the at least one computer to evaluate the message to identify that the UE is interfering with the non-serving node B based upon the information; and
code for causing the at least one computer to cancel the uplink interference from the UE based on evaluating the message to increase an uplink capacity of the non-serving node B.

29. The computer program product of claim 28, wherein the Radio Link procedure is at least one of a Radio Setup procedure or a Radio Addition procedure.

30. The computer program product of claim 28, wherein the information includes an information element (IE), wherein the information element is at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

31. The computer program product of claim 28, wherein the non-transitory computer readable medium further comprises code for causing the at least one computer to employ the canceling of the uplink interference within a UMTS Terrestrial Radio Access Network (UTRAN).

32. The computer program product of claim 28, wherein the non-transitory computer readable medium further comprises code for causing the at least one computer to maintain a list of interfering user equipment for at least one of a base station, the non-serving node B, a neighboring cell, or a cell having inter-cell interference.

33. The computer program product of claim 28, wherein the non-transitory computer readable medium further comprises code for causing the at least one computer to identify that the UE is interfering with at least one of a base station, another non-serving node B, a neighboring cell, or a cell having inter-cell interference as the inter-cell interference occurs.

34. The computer program product of claim 28, wherein the non-transitory computer readable medium further comprises code for causing the at least one computer to utilize a listing of UEs that are interfering with at least one of a base station, the non-serving node B, a neighboring cell, or a cell having inter-cell interference in cancelling the uplink interference from the UE.

35. The computer program product of claim 28, wherein the non-transitory computer readable medium further comprises code for causing the at least one computer to create the message based at least in part on a measurement report for the UE.

36. The computer program product of claim 28, wherein the code for causing the at least one computer to receive receives the message at a Node B, wherein the information identifies interfering UEs.

37. A method that facilitates implementing inter-cell interference cancellation, comprising:
receiving a portion of a measurement report related to a user equipment (UE), wherein the measurement report relates to a time from detection of a non-serving node B to an active set update to include the non-serving node B;
evaluating the portion of the measurement report to identify that the UE is interfering with the non-serving node B based upon characteristics of the non-serving node B measured by the UE that achieve or exceed a first threshold that is lower than a second threshold used for active set management for a serving node B; and
transmitting an interference message to the non-serving node B based upon the characteristics of the non-serving node B being between the first threshold and the second threshold, wherein the interference message specifies the UE and includes at least one information element enabling the non-serving node B to increase its uplink capacity by terminating interference from the UE.

38. The method of claim 37, further comprising transmitting the interference message utilizing RNSAP to at least one of the non-serving node B, a base station, the UE, a neighboring cell, or a cell receiving inter-cell interference from the UE.

39. The method of claim 37, further comprising transmitting the interference message utilizing NBAP to at least one of the non-serving node B, a base station, the UE, a neighboring cell, or a cell receiving inter-cell interference from the UE.

40. The method of claim 37, wherein the transmitting further comprises transmitting the interference message with a Radio Link Setup Procedure.

41. The method of claim 37, wherein the transmitting further comprises transmitting the interference message with a Radio Link Addition Procedure.

42. The method of claim 37, further comprising creating the interference message with at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

43. The method of claim 37, further comprising maintaining a list of interfering user equipment for at least one of a base station, the non-serving node B, a neighboring cell, or a cell having inter-cell interference.

44. The method of claim 37, further comprising identifying that the UE is interfering with at least one of a base station, another non-serving node B, a neighboring cell, or a cell having inter-cell interference as the inter-cell interference occurs.

45. The method of claim 37, further comprising utilizing a listing of UEs that are interfering with at least one of a base station, the non-serving node B, a neighboring cell, or a cell having inter-cell interference in identifying that the UE is interfering with the non-serving node B.

46. The method of claim 37, wherein the interference message enables uplink interference cancellation within a UTRAN based upon the information within the interference message.

47. A wireless communications apparatus, comprising:
at least one processor configured to:
receive a portion of a measurement report related to a user equipment (UE), wherein the measurement report relates to a time from detection of a non-serving node B to an active set update to include the non-serving node B;
evaluate the portion of the measurement report to identify that the UE is interfering with the non-serving node B based upon characteristics of the non-serving node B measured by the UE that achieve or exceed a first threshold that is lower than a second threshold used for active set management for a serving node B;
transmit an interference message to the non-serving node B based upon the characteristics of the non-serving node B being between the first threshold and the second threshold, wherein the interference message specifies the UE and includes at least one information element enabling the non-serving node B to increase its uplink capacity by terminating interference from the UE; and
a memory coupled to the at least one processor.

48. The wireless communications apparatus of claim 47, wherein the at least one processor is further configured to transmit the interference message utilizing RNSAP to at least one of the non-serving node B, a base station, the UE, a neighboring cell, or a cell receiving inter-cell interference from the UE.

49. The wireless communications apparatus of claim 47, wherein the at least one processor is further configured to transmit the interference message utilizing NBAP to at least one of the non-serving node B, a base station, the UE, a neighboring cell, or a cell receiving inter-cell interference from the UE.

50. The wireless communications apparatus of claim 47, wherein the at least one processor transmits the interference message with a Radio Link Setup Procedure.

51. The wireless communications apparatus of claim 47, wherein the at least one processor transmits the interference message with a Radio Link Addition Procedure.

52. The wireless communications apparatus of claim 47, wherein the at least one processor is further configured to create the interference message with at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

53. The wireless communications apparatus of claim 47, wherein the at least one processor is further configured to maintain a list of interfering user equipment for at least one of a base station, the non-serving node B, a neighboring cell, or a cell having inter-cell interference.

54. The wireless communications apparatus of claim 47, wherein the at least one processor is further configured to identify that the UE is interfering with at least one of a base station, another non-serving node B, a neighboring cell, or a cell having inter-cell interference as the inter-cell interference occurs.

55. The wireless communications apparatus of claim 47, wherein the at least one processor is further configured to utilize a listing of UEs that are interfering with at least one of a base station, the non-serving node B, a neighboring cell, or a cell having inter-cell interference in identifying that the UE is interfering with the non-serving node B.

56. The wireless communications apparatus of claim 47, wherein the interference message enables uplink interference cancellation within a UTRAN based upon the information within the interference message.

57. A wireless communications apparatus that enables implementing inter-cell interference cancellation, comprising:
  means for receiving a portion of a measurement report related to a user equipment (UE), wherein the measurement report relates to a time from detection of a non-serving node B to an active set update to include the non-serving node B;
  means for evaluating the portion of the measurement report to identify that the UE is interfering with the non-serving node B based upon characteristics of the non-serving node B measured by the UE that achieve or exceed a first threshold that is lower than a second threshold used for active set management for a serving node B; and
  means for transmitting an interference message to the non-serving node B based upon the characteristics of the non-serving node B being between the first threshold and the second threshold, wherein the interference message specifies the UE and includes at least one information element enabling the non-serving node B to increase its uplink capacity by terminating interference from the UE.

58. The wireless communications apparatus of claim 57, further comprising means for transmitting the interference message utilizing RNSAP to at least one of the non-serving node B, a base station, the UE, a neighboring cell, or a cell receiving inter-cell interference from the UE.

59. The wireless communications apparatus of claim 57, further comprising means for transmitting the interference message utilizing NBAP to at least one of the non-serving node B, a base station, the UE, a neighboring cell, or a cell receiving inter-cell interference from the UE.

60. The wireless communications apparatus of claim 57, wherein the means for transmitting transmits the interference message with a Radio Link Setup Procedure.

61. The wireless communications apparatus of claim 57, wherein the means for transmitting transmits the interference message with a Radio Link Addition Procedure.

62. The wireless communications apparatus of claim 57, further comprising means for creating the interference message with at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

63. The wireless communications apparatus of claim 57, further comprising means for maintaining a list of interfering user equipment for at least one of a base station, the non-serving node B, a neighboring cell, or a cell having inter-cell interference.

64. The wireless communications apparatus of claim 57, further comprising means for identifying that the UE is interfering with at least one of a base station, another non-serving node B, a neighboring cell, or a cell having inter-cell interference as the inter-cell interference occurs.

65. The wireless communications apparatus of claim 57, further comprising means for utilizing a listing of UEs that are interfering with at least one of a base station, the non-serving node B, a neighboring cell, or a cell having inter-cell interference in identifying that the UE is interfering with the non-serving node B.

66. The wireless communications apparatus of claim 57, wherein the interference message enables uplink interference cancellation within a UTRAN based upon the information within the interference message.

67. A computer program product, comprising:
  a non-transitory computer-readable medium comprising:
    code for causing at least one computer to receive a portion of a measurement report related to a user equipment (UE), wherein the measurement report relates to a time from detection of a non-serving node B to an active set update to include the non-serving node B;
    code for causing the at least one computer to evaluate the portion of the measurement report to identify that the UE is interfering with the non-serving node B based upon characteristics of the non-serving node B measured by the UE that achieve or exceed a first threshold that is lower than a second threshold used for active set management for a serving node B; and
    code for causing the at least one computer to transmit an interference message to the non-serving node B based upon the characteristics of the non-serving node B being between the first threshold and the second threshold, wherein the interference message specifies the UE and includes at least one information element enabling the non-serving node B to increase its uplink capacity by terminating interference from the UE.

68. The computer program product of claim 67, wherein the non-transitory computer readable medium further comprises code for causing the at least one computer to transmit the interference message utilizing RNSAP to at least one of the non-serving node B, a base station, the UE, a neighboring cell, or a cell receiving inter-cell interference from the UE.

69. The computer program product of claim 67, wherein the non-transitory computer readable medium further comprises code for causing the at least one computer to transmit the interference message utilizing NBAP to at least one of the non-serving node B, a base station, the UE, a neighboring cell, or a cell receiving inter-cell interference from the UE.

70. The computer program product of claim 67, wherein the code for causing the at least one computer to transmit transmits the interference message with a Radio Link Setup Procedure.

71. The computer program product of claim 67, wherein the code for causing the at least one computer to transmit transmits the interference message with a Radio Link Addition Procedure.

72. The computer program product of claim 67, wherein the non-transitory computer readable medium further comprises code for causing the at least one computer to create the interference message with at least one of UL scrambling code, UL DPCCH Slot Format, Frame Offset, Chip Offset, Maximum Number of UL DPDCHs, Maximum Set of E-DPDCHs, Puncture Limit, E-TFCS Information, E-TTI, or E-DPCCH Power Offset.

73. The computer program product of claim 67, wherein the non-transitory computer readable medium further comprises code for causing the at least one computer to maintain a list of interfering user equipment for at least one of a base station, the non-serving node B, a neighboring cell, or a cell having inter-cell interference.

74. The computer program product of claim 67, wherein the non-transitory computer readable medium further comprises code for causing the at least one computer to identify that the UE is interfering with at least one of a base station, another non-serving node B, a neighboring cell, or a cell having inter-cell interference as the inter-cell interference occurs.

75. The computer program product of claim 67, wherein the non-transitory computer readable medium further comprises code for causing the at least one computer to utilize a listing of UEs that are interfering with at least one of a base station, the non-serving node B, a neighboring cell, or a cell having inter-cell interference in identifying that the UE is interfering with the non-serving node B.

76. The computer program product of claim 67, wherein the wherein the interference message enables uplink interference cancellation within a UTRAN based upon the information within the interference message.

* * * * *